Sept. 26, 1933.   L. M. DIETERICH   1,927,925
PHOTOGRAPHIC PRODUCTION
Filed Aug. 30, 1927    3 Sheets-Sheet 1
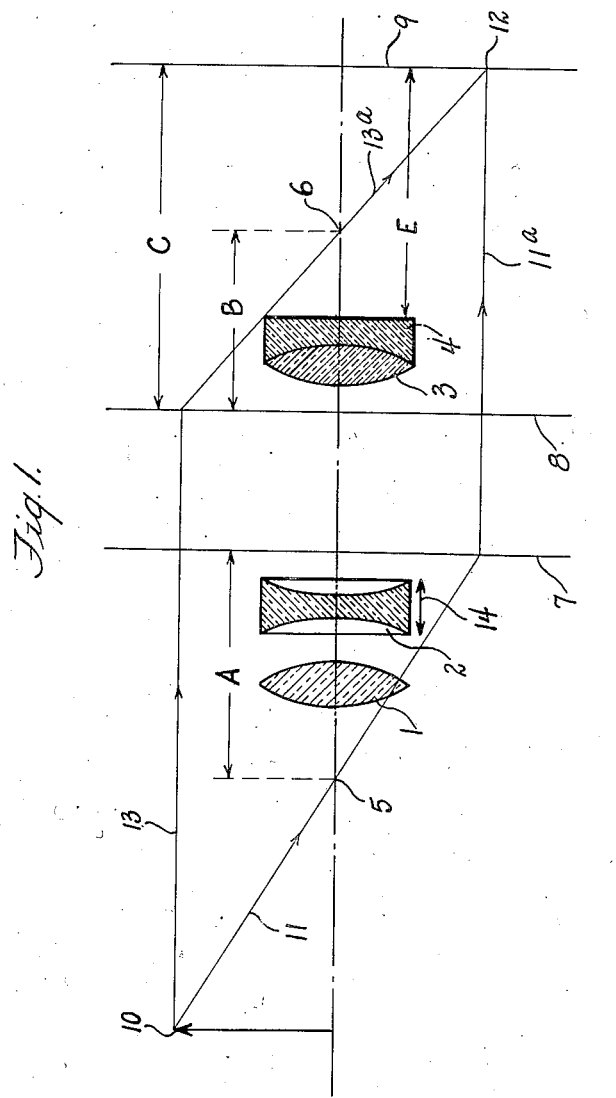
INVENTOR.
Ludwig M. Dieterich
BY
Robert S. Blair  ATTORNEY.

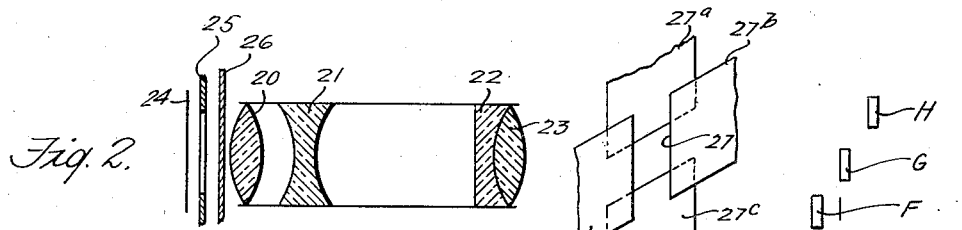
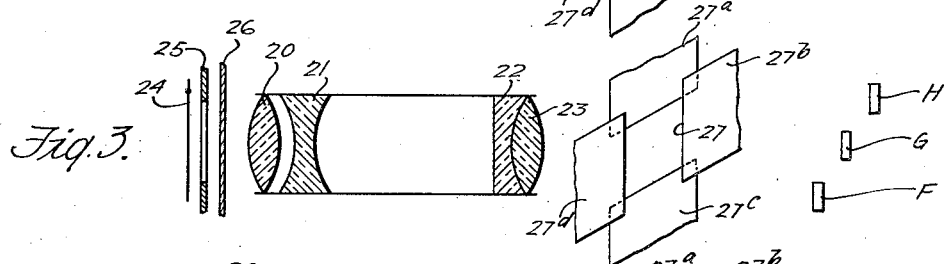
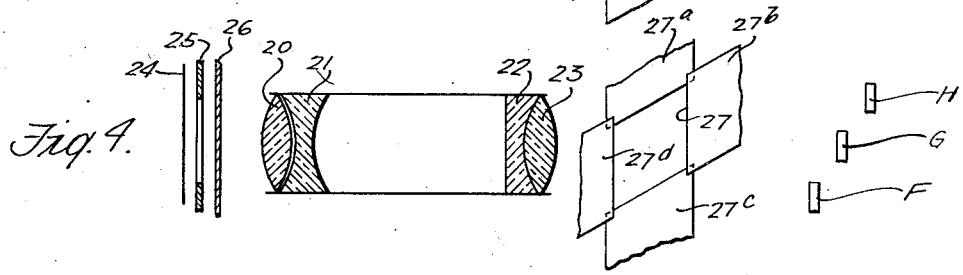
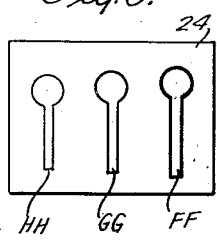
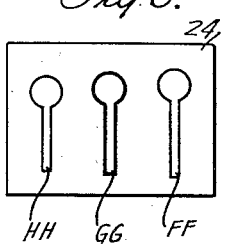
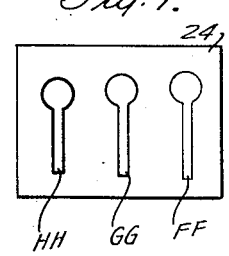
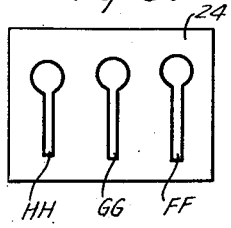

Sept. 26, 1933.   L. M. DIETERICH   1,927,925
PHOTOGRAPHIC PRODUCTION
Filed Aug. 30, 1927   3 Sheets-Sheet 3

Ludwig M. Dieterich
INVENTOR

BY his ATTORNEYS
Jamney, Blair & Curtis

Patented Sept. 26, 1933

1,927,925

UNITED STATES PATENT OFFICE 1,927,925

PHOTOGRAPHIC PRODUCTION

Ludwig M. Dieterich, Newark, N. J.

Application August 30, 1927. Serial No. 216,357

30 Claims. (Cl. 88—16.6)

This invention relates to the production of photographic images, and more particularly it deals with the creation photographically of relief or depth in, for example, what is called the photographic negative, photographic plate, photographic positive, projections made therefrom or thereby, and so-called prints made therefrom.

One of the objects of this invention is to provide a thoroughly practical art or process for creating relief or depth photographically and which may be carried on in a simple and efficient manner. Another object is to provide a process for producing in a single photographic film, plate or the like, images which will stand out clearly in relief. Another object is to provide a process for producing in a single photographic film, plate or the like, clear images of all of the objects in the range of the camera and with substantially the same clearness and sharpness for the image of each object irrespective of the distance of the object from the camera.

Another object is to provide a thoroughly practical process, capable of being inexpensively carried on, for producing photographs or so-called prints in which the objects photographed will stand out with substantially the same clearness and/or sharpness throughout irrespective of their distance from the point at which the scene was viewed and thus to create in the photograph itself depth or relief.

Another object of this invention is to provide a thoroughly practical process for creating depth or relief in projected pictures, either still or motion pictures.

Another object of this invention is to provide an art or process for achieving or creating relief or depth in photographs or so-called prints conveniently, inexpensively, and in a manner capable of being successfully carried out on a commercial scale.

Another object is to provide a process or art for creating depth or relief in the projections of a photographic film or plate which may be readily and inexpensively carried on and without necessitating cumbersome or complicated apparatus or devices; another object is to provide an art or process for creating depth or relief in the pictures projected upon a motion picture screen and in such manner that the usual type of motion picture projection machine and screen may be employed without modification.

Another object is to provide a process or art for exposing a sensitized photographic element such as a film negative or plate, for example, in such a way as to achieve relief or depth in the resulting picture and more specifically in such a way as to achieve substantially the same clearness and/or sharpness for all objects in the range of the camera irrespective of the distance of the objects from the sensitized camera element.

Another object is to provide a photographic film, negative or plate in which clear relief or depth is present; and more specifically to provide such a photographic film, negative or plate, or the like, in which substantially all of the objects, which have affected the photographic element, will stand out with substantially the same clearness and/or sharpness irrespective of their distance from the point from which the scene is viewed or exposure made.

Another object is to produce photographic negatives or positives of an object or scene which negatives or positives, if viewed by an observer, will produce the same sensation of relief or depth that the observer would experience if he were viewing the actual object or scene under the same atmospheric and like conditions under which the photographs thereof were taken, thereby to achieve in the photographic negatives or positives the sensation of natural or actual relief.

Another object is to provide a photographic positive or so-called print which in and of itself has relief or depth; and more specifically, to provide such a photographic positive or plate in which the objects reproduced thereon will have substantially the same clearness and/or sharpness irrespective of their distances from the point from which the scene is viewed or the photograph taken.

Other objects will be in part obvious or in part pointed out in the course of the following specification.

This application is a continuation in part of my application for "Photographic production", filed December 29, 1925, Serial No. 78,222.

The invention accordingly consists in the several steps and relation and order of each of the same to one or more of the others, all as will be illustratively described herein, and the scope of the application of which will be indicated in the following claims.

In the accompanying drawings, in which there are shown diagrammatically certain of the mechanical features of my invention and also certain successive steps in carrying out various embodiments of my invention, Figure 1 is a diagrammatic representation of a lens system showing certain optical characteristics thereof;

Figure 2 is a plan view partly in section of a lens system and objects to be photographed, certain parts being shown in their relative positions during one step of one embodiment of my process;

Figure 3 is a similar view showing the parts during another stage of my process;

Figure 4 is a similar view showing the parts during another stage of my process;

Figures 5, 6 and 7 represent diagrammatically certain results or actions on the film or sensitized camera element corresponding respectively to the steps diagrammatically illustrated in Figures 2, 3 and 4;

Figure 8 shows diagrammatically the final result or action on the film;

Similar reference characters refer to similar parts throughout the several views of the drawings.

Figure 9:
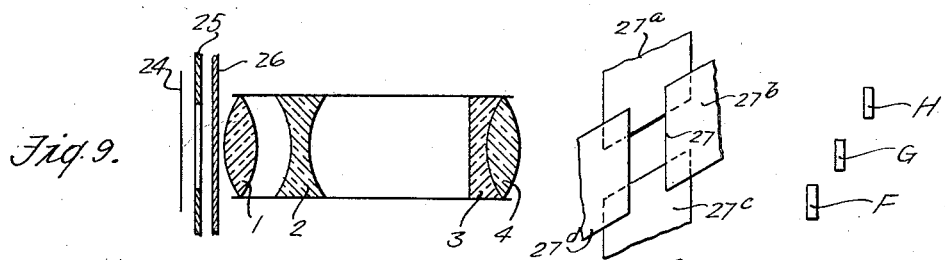
Figure 9 is a view similar to Figure 1 showing the relation of the parts during one stage of another and preferred embodiments of my process.

As conducive to a clearer understanding of certain features of my invention, it might at this point be noted that photographic images, as ordinarily produced, lack plasticity or perspective, the objects in the photograph having a flat appearance just as though all of the objects seen in the picture were located in, and in effect flattened into, a single plane and had extent in but two dimensions. It has been attempted to create the appearance of relief by the use of so-called stereoscopes in which two pictures of a single object are blended into one image from slightly different points of view, in the endeavor to produce upon the eye the impression of relief. With the use of such apparatus, two separate pictures of the objects have to be reproduced, the sensitive surfaces on which the images are produced being positioned side by side and the light rays being focussed on these two sensitive surfaces through two separate lens systems whose axes are nearly parallel and in spaced relation. The negatives are then treated in the usual manner and the two positives then have to be mounted side by side, placed in a special apparatus, and simultaneously viewed through two separate lenses, one for each eye. In this manner the suggestion or illusion of perspective or of three dimensions is attempted to be approximated by reason of the fact that the two views of the same objects were initially taken from two points displaced laterally of each other.

It will be apparent that the above-described stereoscopic method is not only crude and cumbersome, requiring as it does the photographing of the same scene from different angles, the reproduction side by side of the resultant positives, and the use of special and cumbersome apparatus, but also is unsatisfactory in its results, trying upon the eyes, and difficult of being carried out in either a practical or commercial way for the production of still pictures or motion pictures. In its results, this stereoscopic method does not produce or achieve natural relief or depth and at best only partially creates the impression or illusion of natural relief or depth upon the eye but only by virtue of its own complications and the special apparatus which has to be utilized.

One of the dominant aims of this invention is to provide a process for photographically creating relief or depth without having to have recourse to such crude and cumbersome methods and devices as are illustrated by the stereoscopic camera and the stereoscope and to provide a method or process capable of creating actual depth or relief as distinguished from the heretofore attempted illusion of unnatural relief.

As further conducive to a clearer understanding of certain features of my invention, it might first be pointed out that, in taking a picture, as the art of photography is ordinarily practiced, the camera has to be "focussed" with respect to the objects which it is desired to have stand out most clearly and distinctly in the ultimate picture or photograph, and that in thus focussing the camera the later is adjusted upon or with respect to the particular plane (ordinarily a vertical plane) in which the objects to be photographed most nearly lie. All of the objects and/or those portions of the objects which may be considered to be in this plane upon which the camera lens system has been focussed will, in the resultant film or plate or in the resultant photograph or print, be substantially clear and distinct, while objects or other portions of the objects which lie in front or in back of this plane or which are nearer to or farther from the sensitized element of the camera will be more or less blurred, or, as is commonly said, out of focus. The greater the departure of the objects or portions thereof from coincidence with the plane upon which the camera has been focussed, the greater will be the blur. For purposes of a clearer understanding of certain features of my invention, I term the above-mentioned plane with respect to which the camera is focussed the "plane of sharpness", because, as will be clear from what is said above, the objects or portions thereof which are in substantial coincidence with this plane are reproduced, in images thereof upon the sensitized camera element or eventually in the positive or print, most sharply and clearly.

Before taking up in detail my invention, and further to make more readily clear certain features thereof, I wish also to note that, in any film that has been exposed and developed, or in any positive or print made therefrom, the images of the objects positioned in the "plane of sharpness" appear as of a relative size which depends upon various factors such as, for example, the characteristics of the lens system employed, the size of the object, the distance of the sensitized camera element from the plane of sharpness, and other factors. To make this a little more clear, let it be assumed, by way of illustration, that a camera is focussed upon a given plane and an exposure is made. An image of the objects in that plane will be relatively sharply and clearly produced on the sensitized element of the camera, while images of other objects will be relatively obscure. If, now, such adjustments are made as will simply change the focus of the camera, thus to focus the camera upon a new plane of sharpness (either nearer to or farther away from the camera), and a second exposure of the already exposed sensitized element of the camera be made with respect to the objects of which an image has already been taken thereon, the objects which are now in the new plane of sharpness, and which will hence appear in images produced relatively sharply and clearly on the sensitized camera element, will produce new images on the sensitized camera element but of a size different from the size of the images of the same objects as obtained by the first exposure. Thus, greater blurring than ever would be produced by reason of the additional fact that the change of focus brings about a change of size in the images of all the objects, and thus the successive exposures of the same sensitized camera element would result in the superimposition of a differently dimensioned image upon the image obtained by the first exposure.

Now, I have discovered that, by moving the lenses of the lens system of the camera in a certain manner relative to each other and/or relative to the sensitized camera element, I am able to produce upon the sensitized camera element, by a second or subsequent exposure thereof, but with respect to a different plane of sharpness than that of the first exposure, images of the same objects and which images will register in size with the corresponding images achieved by the first exposure; and by thus superimposing two such registering images (preferably by successive exposures of the same sensitized camera element) I am able to produce a single photographic plate or negative in which the images have the characteristics as to clearness or sharpness that follow from the utilization of two different planes of sharpness, it being clear that thus an equal sharpness and distinctness in the image are achieved for such objects as are positioned in these two planes of sharpness and hence at two different distances from the sensitized camera element. Thus, in the resultant sensitized camera element or ultimate positive or print made therefrom, depth is achieved, in that objects at two different distances from the sensitized camera element (corresponding to the two planes of sharpness) appear thereon with substantially equal distinctness and clarity.

I prefer however, to superimpose upon the sensitized camera element a greater number than two registering images of the objects being photographed, each image, however, being that achieved at or with respect to a different plane of sharpness; thus, for example, three registering images are thus superimposed, each being the image achieved at a different plane of sharpness, depth or relief is achieved in that objects lying at three different distances from the sensitized camera element will have their images, upon the same sensitized camera element, brought out with substantially equal sharpness and clarity. And so, if I now superimpose upon the sensitized camera element an infinite number of registering images, taken with respect to an infinite number of different planes of sharpness, respectively, all objects regardless of their distance from the sensitized camera element have their images reproduced in registry on the sensitized element with substantially equal clearness and sharpness. And any photographic positives or prints which I make from the sensitized camera element which, it should be noted, may be developed or otherwise treated in the usual way, will produce the visual depth or relief of the original or negative.

I thus am enabled to achieve substantial naturalness photographically. If the eye be directed upon a given natural scene, the eye naturally focusses upon the point on a single object to which it is directed; this point, it will now be clear, will lie in a corresponding plane of sharpness. The eye, however, will not continue to focus upon this given point, but naturally focusses continually upon other points upon the same object or upon other objects within the range of vision and which may be nearer or farther away. In other words, the eye naturally wanders, automatically accommodating itself to and focussing upon the object to which the attention of the observer is at any instant directed, and as this variation in the focussing continues, the succeeding images which affect the retina will be such as correspond to continually changing and similarly succeeding planes of sharpness. But in the eye, as the latter changes its focus, no change in size of images takes place and the retina records successive images always in registry even though change in focus takes place. In accordance with certain features of my invention, the images of all of the objects within the scope or range of the camera are present with equal size of in-focus and out-of-focus images, thus simulating the projection of images upon the retina of the eye; but in accordance with certain features of my invention, these in-focus and out-of-focus images create the same stimulus upon the sensory organs of vision when viewed on the screen or when seen in a positive or negative print as do the images falling upon the retina in normal unaided vision.

Thus, my invention or discovery makes it possible to produce pictures having natural relief and depth, as distinguished from the unsatisfactory illusion or suggestion of relief or of unnatural relief attempted by the use of stereoscopic devices or methods. In the latter, certain characteristics of which have hereinbefore been noted, the eyes have to be directed upon two separate views and the natural tendency of the eye to wander results in its focussing upon objects which are without the plane of sharpness to which the camera has been adjusted or focussed. This results, upon continued observation, in eye strain, manifesting itself in an uncomfortable drawing sensation in the eye muscles. In the pictures produced in accordance with my discovery, no eye strain results because of the close simulation or duplication of nature and because the effect upon the eye is very closely if not entirely the same as if the eye were viewing the original or natural objects themselves.

In the endeavor to make clear my present understanding of the theory involved in my discovery, it will be helpful to consider first certain known characteristics, as they are now understood by those skilled in the art of photography, of a known or representative camera lens system. In this connection I would refer to the diagrammatic representation in Figure 1 of the drawings of such a system. It is to be understood, however, that the lens system may be made up of lenses other than those chosen for illustration in the drawings. In Figure 1 of the drawings I have indicated a camera lens system illustratively made up of a positive lens 1 related to a negative lens 2 to form one of two lens groups; the second lens group, appropriately spaced from the first, may consist of a positive lens 3 and a negative lens 4. The lens system may have any suitable number of lens groups and by way of illustration two lens groups, as noted above, are shown in the drawings. The first lens group is constituted of the lenses which produce the image and which may be called the imaging lenses, and the second lens group is constituted of lenses which correct certain errors and which may be called corrective lenses. Such a lens system may be considered typical of those employed in known photographic cameras. As examples of a lens system heretofore known and having lens groups like those just-mentioned, the so-called "Unar" and "Tessar" lenses or lens systems might be mentioned, though they are not to be confused with certain aspects of my invention. In accordance with the understanding of those skilled in the art of photography, it is assumed that such a typical or illustrative lens system has what is called a "first principal focal point", which I have indicated in the drawings at 5, and a "second principal focal point", which is indicated at 6; it is also assumed that the lens system has what is called a "first principal plane" and what is called a "second principal plane". These two planes are indicated at 7 and 8 respectively. The "image plane", or the plane at which the sensitized camera element, such as the plate or film, is positioned, known also as the "conjugate focal plane", is indicated at 9. These characteristics of any photographic lens or lens system are well known in the art, and are the factors which are used, as is also well known in the art, in designing lenses or lens systems or in analyzing lenses or lens systems, particularly by well-known graphical methods.

In order to make these characteristics of the lens system a little clearer, their relation with respect to a point, or an object, within the range of the camera, may be considered. Thus, at 10 I have shown a single point from which light rays are to pass through the lens system to affect the sensitized camera element positioned in the plane 9. A light ray, emanating from the point 10, is indicated at 11; it passes through the first principal focal point 5 and, upon reaching the first principal plane 7 has its direction changed as indicated by the line 11a, whence it continues, as is shown in Figure 1, parallel to the optical axis, striking the image plane 9 at 12. Another light ray 13 passes directly through the lenses, in a path parallel to the center line of the lens system, to the second principal plane 8 from which, with its direction changed, it passes as indicated by the line 13a, through the second principal focal point 6 and strikes the image plane 9 at the same point 12 at which the light ray 11 strikes the image plane and at which point an image of the object (the point 10) is produced.

It will be understood that the rays, in passing through the lenses, undergo bending at each surface, though, for purposes of greater clarity and to avoid undue complexity, simply the general relative positions of the lenses and the general directions of the light rays have been shown. It might here be added that such a showing is entirely sufficient for considering and establishing, both graphically and correctly, the image-forming characteristic of a lens system.

The distance A between the first principal focal point 5 and the first principal plane 7 is called the "first equivalent focal length"; the distance B between the second principal focal point 6 and the second principal plane 8 is called the "second equivalent focal length". The distance C between the second principal plane and the image plane is called the "second conjugate focal length". The distance E between the rearmost point of the rearmost lens 4 of the system and the image plane 9 is called the "back focal length". These factors are, like those immediately above mentioned, also well known designations and will be seen to be corollary to the above-mentioned known characteristics of a lens system.

When a camera is focussed upon an object, or more correctly upon a plane, the lenses of the lens system of the camera are in certain fixed positions relative to one another and in a certain position relative to the sensitized camera element, and the focal lengths mentioned above have certain values. If, as has been explained hereinbefore, the position of the lens system is now adjusted in known manner, that is, by appropriate adjustment in an axial direction of the lens system as a whole relative to the image plane 9, so as simply to change the focus of the camera, the images of objects in the scene, produced at the image plane 9, change in size. This result is a well-known fact and due to this fact, namely, that the size of the image is changed by known methods of changing focus, it has not been possible to effect a registering super-imposition of successive images, each corresponding to a different plane of sharpness, one upon the other. These considerations will suffice to make clear the action that results with known photographic camera lens systems and methods, and to make clear also the deficiencies of such known systems and methods.

While such known deficiencies in known systems and methods will thus be clear, nevertheless, they are later hereinafter further considered briefly, particularly in connection with a graphic representation of certain actions that take place in a preferred embodiment or method of my invention; but for present considerations, the statements immediately above made will suffice.

In accordance with my discovery, however, I make it possible to achieve change in focus of the camera lens system while simultaneously retaining the same size of image even though the change in focus is between widely separated extremes. Throughout whatever changes in focus that I bring about, in accordance with my invention I maintain constant the size of both in-focus images and out-of-focus images. I am able to bring different planes in the scene into sharpness in the image formed by the lens system, without changing the sizes of the images on the film or image plane of the objects in the scene. I am thus enabled to produce upon the same camera plate or sensitized camera element any desired number of superimposed registering images, each image corresponding to a different plane of sharpness. Bearing in mind now the lens system briefly described above and shown in the drawings, and considering a preferred way of carrying out my discovery, I make one or more of the lenses of the lens system movable axially relative to the other lenses of the system, and either by giving this movable lens a characteristic hereinafter pointed out more clearly, or by moving the movable lens relative to the other lenses of the system and also moving the entire lens system relative to the image plane, I am enabled to change the focal value of the whole lens system without changing the size of the image incident upon the film or sensitized camera element. In Figure 1 of the drawings I have indicated the lens 2 of the first lens group as the axially movable lens; the arrow 14 indicates the capacity of the lens 2 for movement in an axial direction. When, therefore, after one exposure and hence after producing upon the sensitized camera element an image, I so change the relation of the lenses with respect to each other and/or with respect to the sensitized camera element (as by moving the lens 2) that the focus is changed and so that the new image of the same object corresponds to a different plane of sharpness, the size of the new image produced on the sensitized camera element or film, of the same object, by a subsequent exposure is not different from that of the image produced by the first exposure; the images of objects on the film or plate, achieved by such successive exposures, will therefore substantially register throughout and may and can, as I have found in practice, be superimposed one upon the other with excellent results.

The advantages of my invention may be achieved in practice in various ways. In accordance with one embodiment of my invention, I employ a camera having a lens system which is movable as a unit toward and away from the sensitized camera element and in which certain (preferably only one) of the lenses are movable with respect to the others. I then focus the camera upon a certain plane of sharpness, the lens system as a unit being accordingly adjusted to a certain distance from the sensitized element, and the movable lens being adjusted to a certain position with respect to the sensitized element. The camera shutter is then opened for a period of time suitable to make an exposure, and an image is impressed or achieved upon the sensitized element. The shutter is then closed, and thereupon I move the lens system as a whole to change the focus of the camera and to focus the camera upon a second plane of sharpness nearer to or farther away from the camera; I then move the movable lens to such a position as will rectify the size of the image and as will thus keep the image to be produced by a subsequent exposure of the same size as the first image and hence in registry with the first image produced by the previous exposure of the sensitized element. The shutter is now opened to effect this subsequent exposure, whereupon, a second image of the same objects is impressed or produced upon the sensitized element, superimposed upon the image achieved by the first exposure, the two images registering throughout and the second having a plane of sharpness different from that of the first. This procedure may be repeated as many times as desired, each time focussing the camera upon a different plane of sharpness and each time moving the movable lens to a position to maintain the same size of image, all with results which will now be clear in view of the foregoing.

While the practice of this embodiment of my invention is clear in view of the foregoing, yet it may be helpful to explain somewhat in detail the sequence of the various steps, in connection with the drawings and in Figures 2, 3 and 4 I have illustrated diagrammatically three successive steps of the nature immediately above outlined. The lens system is made of the lenses 20, 21, 22 and 23 which are movable as a unit with respect to the sensitized camera element or film 24 and one of which, such as the lens 21, is movable with respect to the remaining lenses of the lens system.

In Figures 2, 3 and 4 I have represented the scene to be photographed by three objects F, G and H, all of the same size, spaced laterally from each other and spaced also along the optical axis; for purposes of simpler illustration, the objects F, G and H may take the form of disks supported upon a small rod or standard.

I first focus the camera upon a plane of sharpness in which lies the object F, suitably adjusting the lens system as a unit to a certain distance from the sensitized element 24 and seating the movable lens 21 in an appropriate position with respect to the remaining lenses. A suitable aperture 25 is provided and with that aperture coacts a shutter 26. Having adjusted the parts as above described and as is diagrammatically indicated in Figure 2, I open the shutter 26 for a suitable period of time, whereupon an image of the object F is achieved upon the sensitized camera element 24; this image F, F, shown in Figure 5, is sharp and clear, as is indicated by the heavy lined image F, F of Figure 5 since the object F of Figure 2 is in the plane of sharpness upon which the apparatus has been focused. At the same time object G of Figure 1, being more remote from this plane of sharpness, appears on the sensitized element or film 24 (see Figure 5) less sharp and clear and smaller, as is indicated at G, G in Figure 5, while the image H, H of Figure 5 of the object H of Figure 2, the latter being still more remote from the plane of sharpness through object F, appears less sharp and clear and still smaller. In Figure 5 the differences in the sharpness of these images is indicated by the heaviness of the lines outlining the images.

Thereupon, I move the lens system as a whole to change the focus of the camera and to focus the latter upon a plane of sharpness corresponding to the plane in which the object G rests; this change in the position of the lens system as a whole with respect to the sensitized camera element 24 is indicated in Figure 3 but since such change of focus would cause a change in the size of the images, I now move the movable lens 21 to such a position as will rectify or correct this change of size of image and as will thus keep the images to be produced by the next exposure of the same size as the images already produced on the camera element 24, as shown in Figure 5. The relative change in position of the parts is indicated in Figure 3. Then the shutter 26 is again opened for a suitable period of time to again expose the camera element 24 to the scene or objects F, G and H but this exposure results in images like those shown in Figure 6 in which the image G, G of the object G is now sharp and clear, indicated by the heavier lines, but is of the same size as the image G, G of Figure 5; images F, F and H, H of Figure 6, corresponding to the objects F and H, respectively, nearer to and farther from the camera than the plane of sharpness through image G, appear less clear and sharp but of the same size that they had respectively in Figure 5.

Thereupon, the lens system as a whole is again adjusted to focus the camera upon the most distant object H and the movable lens 21 positioned with respect to the remaining lenses to a position such that the sizes of the images (otherwise changed upon the change of focus) remain the same as in Figures 5 or 6, whence the shutter 26 is again opened for a suitable period of time to make the third exposure.

This third exposure results in images like those shown in Figure 7, image H, H of object H being now sharp and clear but of the same size as images H, H of Figures 5 and 6, while images G, G and F, F are less sharp and clear but respectively of the same size that they had in the exposures corresponding to Figures 5 and 6.

Inasmuch as these successive exposures are of the same film or sensitized camera element, in this embodiment of my invention, the images diagrammatically indicated in Figures 5, 6 and 7 are superimposed upon one another with the result indicated in Figure 8 in which it will be seen that all of the objects, though of different distances from the camera, appear sharp and clear and each image corresponds to a single plane of sharpness through that portion of the scene corresponding to the image. I have not specified distances of the objects F, G and H from one another or from the camera, but the results of the steps diagrammatically shown in Figures 2, 3 and 4 and as indicated in Figures 5–8, I have found in practice, are most forcibly illustrated where the object F is very close to the camera, for example, four or five feet from the camera, object G is, for example, fifteen feet from the camera, and object F about thirty feet or so from the camera, these distances, cited merely for purposes of illustration, making up a scene which it is impossible to photograph satisfactorily with methods or apparatus heretofore known.

Instead of first moving the lens system as a whole and then the movable lens relative to the others of the system as explained above, I prefer to effect these movements simultaneously. Also, I prefer to effect these simultaneous movements as a continuous movement throughout their entire or desired range while the shutter is open and the sensitized element is exposed, as distinguished from the intermittent movements and intermediate opening and closing of the shutter as explained above. In this manner new planes of sharpness are continually and in succession brought into effect, all during the interval that the sensitized element is exposed while, at the same time, the effect of change of focus in causing different sizes of images is neutralized so that the images of the objects do not change in size and thus register. Thus I produce, in the sensitized camera element, a single image built up of an infinite number of superimposed registering images, each corresponding to one of an infinite number of planes of sharpness. And accordingly, in the photographic negative, or positive or print made therefrom, objects at all distances from the camera appear with substantially equal sharpness and clarity, and thus blurring is avoided. The relief or depth thus achieved will, it is believed, be clearly understood in view of what has hereinbefore been set forth. The planes of sharpness, it may be noted, may range from a plane adjacent the camera to a plane greatly distant from the camera and, for example, where the scene is an outdoor scene, this distance plane may extend to the remotest point in the scene.

In carrying out those embodiments of my invention just described and according to which bodily movement of the lens system as a whole is correlated with the movement of the movable lens or movable lens component of the lens system, I may employ a camera embodying therein, with good effect, a lens system of the "Unar" or "Tessar" types but in which, as contrasted with heretofore known methods of using "Unar" or "Tessar" lens systems, I make one of the lenses movable relative to the others, as well as moving the lens system as a whole. Thus, the lenses 20, 21, 22 and 23 of Figures 2, 3 and 4 may be the components of a so-called "Unar" lens system, though I make one of the components, lens 21, movable. Hence, in carrying out the steps above described in connection with Figures 2, 3 and 4, I may use with excellent results a "Unar" type of lens system.

In accordance, however, with the preferred embodiment of my invention, I employ a lens system in which I make a lens or lenses (preferably one) movable with respect to the other lenses of the system, and which lens system has certain characteristics which I have discovered. I employ a lens system having a lens which is movable with respect to the other lenses of the system; this movable lens, however, is of special construction and has the characteristic in its combination with or relation to the other lenses of the system that movement thereof axially changes the focus (thus moving the plane of sharpness) but does not alter the size of the image of the objects produced upon the sensitized camera element, which is in coincidence with the conjugate focal plane or image plane 9; this characteristic achieves change in equivalent focal length without change of the size of the image of the objects produced upon the sensitized camera element because such change in equivalent focal length of the lens system is accomplished in my special construction without change of the distance between the film plane and the principal planes of the lens system. By moving this lens axially in a certain manner, I am enabled to bring into sharpness, in the image formed by the lens system, planes at different distances from the lens system, and without changing the sizes of the images of the objects. I move this movable lens, while holding the shutter open and while thus exposing the sensitized element, and I move it through such a distance that the plane of sharpness is successively moved throughout any desired range, for example, extending from a plane near the camera to a plane at a great distance away, or, I may effect the movement in the reverse direction. Each change in focus is thus accompanied by an automatic maintenance of the size of the in-focus and out-of focus images on the film. Thus I achieve upon the same sensitized element, or upon the same plate or film or negative, or upon a positive or print made therefrom, an infinite number of superimposed registering images, each corresponding to a different focus and hence I produce the sharpness and clearness which result from an infinite number of planes of sharpness in a single image.

Briefly considered, as I now understand the theory of what takes place when such a change in relation is brought about when I practice my invention, I am effecting among other things a change in the second equivalent focal length B (Figure 1) without changing the position of the second principal plane 8 re'ative to the stationary lenses (the lenses 1, 3 and 4, for example) of the system and relative to the image or film plane 9.

For purposes of illustration it may be assumed that the lens system shown in Figure 1 of the drawings is a system such as just above described. The lens 2 may be considered the movable lens having the above-mentioned characteristic, in relation to the other lenses, whereby its axial movement relative to the other lenses of the system changes the equivalent focal length of the lens system but maintains constant the size of the image. This lens 2 I move axially in one direction or the other relative to the other lenses, as is indicated by the arrow 14, while the camera shutter is held open and the sensitized camera element, which coincides with the image plane 9, is thus exposed. For ordinary outdoor photography, the distance throughout which the movable lens 2 is moved in an axial direction is preferably such that the focal value of the camera lens system is changed from one where the plane of sharpness is very close to the camera to one where the plane of sharpness is as distant from the camera as the most remote point of the scene; this movement is preferably a continuous one and thus I effect a steady change in the focal value of the lens system throughout a predetermined range and an infinite number of planes of sharpness are brought into effect. This movement is effected while the camera shutter is held open so that there are produced upon the sensitized camera element, in effect, an infinite number of registering images, one for each of the infinite number of planes of sharpness. The sizes of the images of the objects reproduced do not change as the focus of the lens system is changed throughout this range. In accordance with my understanding of the theory involved, when I move this movable lens, corresponding illustratively to the lens 2 in the drawings, in an axial direction as indicated by the arrow 14, the second equivalent focal length B changes while the second principal plane 8 does not move relative to the stationary lenses 1, 3 and 4 and relative to the image or film plane 9; due to these latter considerations, the sizes of successive images are the same although each image corresponds to a different focus and hence to a different plane of sharpness.

It is believed that the practice of this last-described embodiment of my invention will be clearly understood from the foregoing, but it may be helpful to consider several successive stages of action that take place; referring to Figure 9 I have shown this special lens system diagrammatically made up of the lenses 1, 2, 3 and 4 above described and having the special characteristics above described, related to the sensitized camera element or film 24 and to the same scene above described in connection with and shown in Figures 2, 3 and 4. During the period that the shutter 26 is open the lens system remains fixed with respect to the film 24 and with respect to the scene F, G and H but the movable lens 2 is moved as above described; as it is moved, it achieves a focusing of the camera upon successive planes of sharpness from a point very near the camera to a point relatively far removed from the camera, for example, from a point around five feet from the camera to a point that may be several hundred feet or several hundred yards from the camera all, however, while maintaining constant the size of the images formed on the camera element or film.

Figure 10:
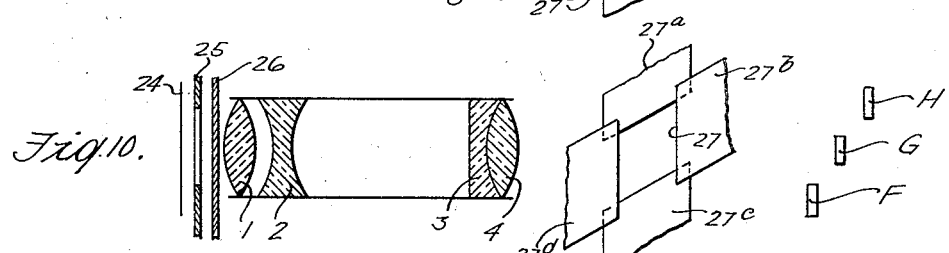
Figures 10 and 11 are views similar to that of Figure 9 showing the relative positions of certain of the parts during subsequent stages in this preferred embodiment of my invention.
Figure 11:
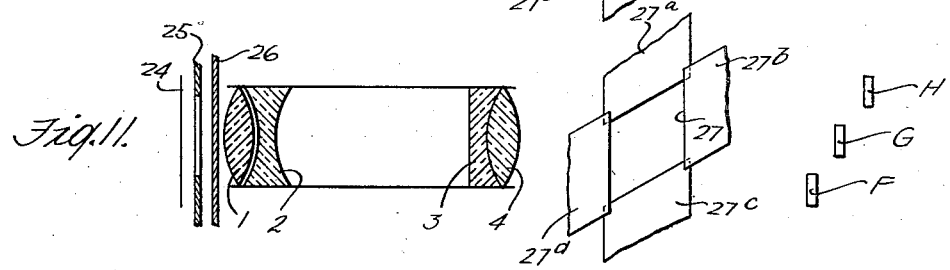

Figures 9, 10 and 11 represent three successive positions of the movable lens 2 during the above described movement that takes place during the single exposure of the film 24 and are intended diagrammatically to represent such positions that in Figure 9 the single plane of sharpness effective is the plane in which the object F lies, in Figure 10 the plane of sharpness that is effective is the one in which the object G lies, while in Figure 11 the plane of sharpness is the plane in which the object H lies. The successive actions upon the film 24 are indicated in Figures 5, 6 and 7 from which it will be seen that, as this plane of sharpness is thus in effect moved from a point near the camera to a point remote from the camera, the image F, F of object F is first brought into sharpness and clarity (Figure 5), then the image G, G of object G (see Figure 6), and then the image H, H of the object H (see Figure 7) all, however, without changing the size of any of these images even though the focus of the lens system or camera undergoes wide changes. These images, however, being impressed upon the same film during the same exposure as thus superimposed one upon the other and, being maintained of the same size in spite of the change in focus, the images of the respective objects register with the result shown in Figure 8. While, therefore, at any one plane of sharpness, only the objects in that plane of sharpness are in focus and are clear and sharp on the film, yet, at the conclusion of the practicing of my process, all of the objects, no matter what their distance from the camera, appear sharp and clear and none of them appear blurred or out of focus, as is plainly indicated in Figure 8.

It might at this point be noted that I have achieved excellent results in practice by a lens system constructed to have the above-mentioned characteristics, namely, that movement of the movable element of the lens system achieves a change in the equivalent focal length without change of the position of the principal planes of the system.

If, now, I make the sensitized camera element in the form of a long strip of film, and upon which a succession of separate photographic units or exposures may be produced, as in the usual form of motion picture negative film, and then intermittently move the film while, at each stoppage or halting thereof, I carry on the steps of the preferred embodiment of my process, as immediately above outlined, I am enabled to achieve upon each unit of the film or negative (and hence upon the positive that may be made therefrom for projecting purposes) an infinite number of registering images, each corresponding to a different focus; thus I achieve, on a motion picture film, the sharpness and clearness and hence the depth or relief that result from an infinite number of planes of sharpness. Such depth or relief will be reproduced in the projection of the motion pictures upon the screen. In carrying out my process to produce relief or depth in motion pictures, in taking the pictures I preferably move the negative film intermittently and, at each halting of the film, I open the shutter to expose a unit of the film, move the movable lens (which has the characteristics pointed out above) through such a distance that the plane of sharpness is successively moved throughout a range extending from a plane preferably near the camera to a plane preferably at an infinite distance away, close the shutter and, while the shutter is closed, move the film throughout a distance equivalent to the length of a photographic unit on the film, halt the film, whereupon the steps just outlined may be repeated in substantial sequence. The resultant negative film I may develop in any suitable or usual way and from it produce, in any suitable or usual way, a positive for projecting purposes. The same sharpness and clearness or depth and relief which are characteristic of the negative, and which result from an infinite number of planes of sharpness, will be reproduced in the positive and also in the projection of the images upon a screen, and the projecting upon a screen I may and can carry out by the use of an ordinary or usual form of motion picture projecting machine and by using an ordinary or usual form of screen. In projecting upon a screen the images from a motion picture positive made in the manner just described, the usual form of motion picture projection machine and screen without modification can be employed.

While I prefer to superimpose registering images upon the same photographic negative or photographic motion picture negative and which images result preferably from an infinite number of planes of sharpness ranging from a plane near the camera to a plane greatly distant from the camera, it will be understood that my invention is not limited to such a wide range of planes of sharpness but that any intermediate range of planes of sharpness may be utilized if desired.

Furthermore, it is to be understood that I may move the movable lens during a single shutter opening (or during a single exposure of the sensitized photographic element) successively in both directions; that is, I may, during a single shutter opening, effect such an adjustment of the lens system that the plane of sharpness is moved from one extreme to the other extreme and then back again to the first extreme. Also, and irrespective of whether I adjust the lens system in either one direction or in both directions successively, I may effect the adjustment uniformly or non-uniformly, and I do this preferably by giving the movable lens a corresponding uniform or non-uniform speed, all according to the photographic effect which may be desired; thereby I am enabled to control the time of exposure of the sensitized photographic element for different planes of sharpness. I may also effect, during a single shutter opening, such an adjustment of the lens system as will move the plane of sharpness from one extreme to the other extreme and then in reverse direction to a position intermediate of these two extremes, effecting this adjustment either at a uniform or non-uniform rate, depending upon the ultimate effects desired.

Preferably, also, whether my invention be employed in motion picture photography or in other classes of photography, I control the amount of light admitted to the sensitized camera element through the lens system, as the plane of sharpness is moved toward or away from the camera. I provide an adjustable opening through which the light rays are required to pass, and I increase the size of this opening as planes at an increasing distance away are brought into sharpness in the image. In this manner proper and accurate functioning of the lens system is assured throughout the range of movement of the plane of sharpness.

To illustrate how I might effect the control of the amount of light, all as above described, reference might be made to Figures 2, 3 and 4 in which are illustrated three of the various possible successive steps of one embodiment of my invention, and I have diagrammatically indicated in these figures an adjustable opening 27 constructed in any suitable manner and merely diagrammatically shown in perspective as comprising four plate-like members 27$^a$, 27$^b$, 27$^c$ and 27$^d$, which may be arranged in series and which may be adjustably positioned to enlarge or make smaller the size of the opening 27.

In Figure 2, with the camera focused upon the nearest object F, the opening 27 is relatively small, but in Figure 3 where the camera is focused upon a more distant object, namely object G, the opening 27 is larger than in Figure 2, while in Figure 4, where the camera is focused upon the most distant object, the opening 27 is largest.

As for the embodiment of my invention diagrammatically shown in several of its steps in Figures 9, 10 and 11, the control of the amount of light in proportion to the distance of the image from the camera may be achieved by an adjustable opening like the opening 27 of Figures 2, 3 and 4. And in Figures 9, 10 and 11 I have shown the opening 27 of progressively larger size inasmuch as Figures 9, 10 and 11 diagrammatically indicate focusing upon progressively more distant portions of the scene.

I wish also to note at this point that my invention achieves particularly very important results in the field of motion pictures wherein I am enabled to obviate one of the most serious defects in the art of motion picture photography as the latter is now practiced. In present day motion picture photography, when an object is in motion in the field of the camera and particularly when the motion of the object is transversely or across the field of the camera while the camera is focused in the usual way upon the moving object, the motion that takes place during a single exposure produces a series of relatively displaced superimposed and non-registering images of the object, all of the images standing out with almost the same degree of sharpness and thus causing great blurring and indistinctness. This defect is most pronounced where the object moves across the field of the camera and relatively close to the latter. With my method, however, such blurring and indistinctness is completely eliminated, since the moving object is photographed sharply and distinctly only at the one instant when the moving plane of sharpness passes through the moving object itself; any subsequent displacement of the object in the field of the camera finds the latter focussed not upon the moving object (as is the case with present day methods) but focussed upon a plane of sharpness moving progressively away from the object itself. Accordingly, the displaced positions of the moving object, if photographed at all upon the sensitized photographic element in the camera, are impressed upon the latter with an increasing lack of clarity and photographic intensity as the plane of sharpness moves away from the object itself. Thus, I am enabled to eliminate the blurring effect of so-called "cross-motion", an effect heretofore considered as unavoidable.

I have above set forth clearly and fully the objects of my invention, the results of carrying on the several embodiments of my invention, and the detailed modes of carrying out the various and several steps thereof; from all of this, the practicing of my invention will be clearly and readily understandable though, in so far as the preferred form of my invention is concerned, it may be helpful to explain somewhat more in detail various aspects of the construction of the lens system therein employed. I have above pointed out, with reference to Figure 1, that shifting of the movable lens 2 along the optical axis changes the focal length B without, however, causing a change in the position of the second principal plane 8 relative to the stationary lenses 1, 3 and 4 and relative to the film plane 9 and that, due to these considerations, the sizes of successive images are identically the same although each image corresponds to a different plane of sharpness. The principal plane, therefore, remains fixed and the principal focal point shifts; the lenses, in construction, are therefore correspondingly corrected, using any known method of lens computation. When so corrected, therefore, the light rays, in passing through the lens system during movement of the movable lens, are bent or controlled and strike the image plane in pencils that give circles of confusion for the out-of-focus images that are concentric with the in-focus point images that make up an in-focus image of the scene or object. Due to this concentricity, constancy of size of in-focus and out-of-focus images results.

The lens system shown in Figure 1 and made up of the lenses 1, 2, 3 and 4 shaped generally as shown in Figure 1 is not a "Unar" lens system but is of the "Unar" type. As has been pointed out above in connection with those embodiments of my invention that were first described, a "Unar" or "Tessar" lens system may be employed in carrying out those embodiments providing that one of the lenses of the system is made movable so that rectification of change of size of image may be thereby achieved when change of focus, achieved by shifting the whole lens system, effects inherently and necessarily a change in size of image, or vice versa; this, it is believed, appears clearly in connection with Figures 2, 3 and 4 of the drawings as above described.

In connection with these first described embodiments of my method, therefore, the production of an image corresponding to a given plane of sharpness is accompanied by at least two steps which are, as already pointed out, correlated; one of these steps entails changing the focus and the other entails correction or rectification of the size of the image of the object for the new focus to cause the size of this new image to be the same as the image that was earlier produced for a different focus. My preferred method (Figure 1) entails but a single movement, namely that of the movable lens, because the lens system has the special characteristic above defined; necessarily, therefore, where a "Unar" or "Tessar" type of lens system suffices, by way of example, to carry out the first above described embodiments when one of the lenses thereof is made movable in coaction with movement of the entire lens system, known "Unar" or "Tessar" lens system with one lens movable could not and would not suffice to carry out the preferred method of my invention. This will presently become clear.

Figure 12:
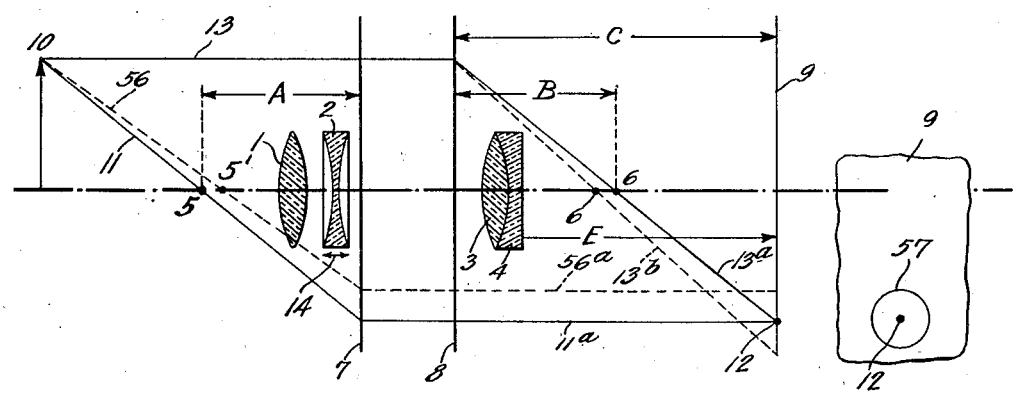
Figure 12 is a diagrammatic and graphic representation of certain actions that take place in the lens system embodying the preferred form of my invention.

In contrast to lens systems such as may be employed in carrying out my first above described embodiments of my invention and in contrast to lens systems heretofore known in which a change in focus is achieved by various means, the optical system of the preferred embodiment of my invention (as in Figure 1), having the special characteristics above already explained, may now be considered and hence reference may be made to Figure 12. In this figure, all of Figure 1 is reproduced, thus to show the point image 12 of the object point 10, exactly as it is achieved in Figure 1 by a consideration of the four cardinal factors of the lens system; however, let it now be considered that the lens 2 is shifted to the left. The focal length B is, in accordance with the optical prescription above stated, permitted to change but without changing the position of the principal plane 8 relative to the lenses 1, 3 and 4 and relative to the film plane 9. The second principal focal point 6 is thus moved to the position 6', being moved toward the optical center of the lens system and a commensurate shifting toward the optical center of the first principal focal point 5 takes place, namely to the position 5'. No shifting in the principal planes takes place. Light rays 13, after this shift in the lens 2, strikes the principal plane 8 and is bent as at 13ᵇ, passing through the new focal point 6'. The first principal focal point having, however, moved from the point 5 to the point 5', a light ray 56 from the point object 10 passes through the focal point 5', strikes the principal plane 7 and is bent as at 56ᵃ to pass parallel to the optical axis. Similar rays, intersecting as shown by the broken lines, produce a circle of confusion 57 whose center is spaced from the optical axis by exactly the same distance as the spacing of the point image 12 from the optical axis. The point image 12 and the circle of confusion 57 are concentric. No change in size of the new image results because of this concentric relation.

Thus, the full-line representation in Figure 12 and hence also that of Figure 1 may be considered to represent graphically what happens when the lens system having the special characteristics above point out has its movable component 2 positioned so that the camera is now focussed on the point object 10, or, stated differently, when the plane of sharpness is spaced from the film plane 9 by the same distance as the spacing therefrom of the point object 10 while the broken lines of Figure 14 show diagrammatically what happens to light rays emanating from the fixed point object 10 when the movable component 2 of the lens system is shifted to change the focus of the system so as to bring into effect a plane of sharpness whose distance from the film plane 9 is different from the distance therefrom of the point object 10. So-called circles of confusion are considerations characteristic of all photographic lenses but in so far as I am aware, no lens system has heretofore been produced in which the above-mentioned concentricity, achieved by changing focal length without shift of the principal plane, has been brought about. No matter what the change in focus or shifting of the plane of sharpness away from the plane of sharpness through the object point 10, the circle of confusion always stays concentric to the point image 12. Correspondingly, this permanent concentricity establishes the fact that the size of the image of an object in the photographic field of my preferred form of lens system remains constant for all values of focus.

I have above pointed out that, as is well known, change in the focus of a lens system of known type or types when employed in a camera results in change of size of image, where change of focus is achieved by such known methods as shifting the entire lens system relative to the sensitive surface, or shifting one of the lenses of a lens system, or otherwise. Now, such change of size of image arises out of the fact that, with such known methods or systems of changing focus, circles of confusion are produced on the sensitive surface that are eccentric with respect to the in-focus image of the point or points corresponding to which, when the focus is changed, the outer focus circles of confusion are produced. This eccentricity, inevitably, therefore, causes change in size of the out-of-focus image. These vital deficiencies of known methods or apparatus I overcome in my preferred embodiment of my invention in making certain that the out-of-focus circles of confusion are always concentric with the in-focus image of the corresponding point or points, as is perhaps more clearly shown graphically in Figure 12.

The lens system of Figures 1 and 12 employed in carrying out the preferred form of my invention, is, therefore, computed and corrected, with known methods, by the lens computor, on the basis of the maintenance of constancy of size of image (and hence the maintenance of the above mentioned concentricity) for all positions of the movable lens 2 (within its limited range of movement) while maintaining in fixed position the principal planes though achieving change in the principal focal lengths.

These additional considerations, while not deemed necessary to enable one to practice the preferred embodiment of my invention, nevertheless may be helpful in clarifying certain aspects of this embodiment and in arriving at a clearer or quicker understanding of these aspects.

It will thus be seen that I have provided a thoroughly practical process or art for photographically creating relief or depth, and that this process may be carried on in practice conveniently, inexpensively and with thoroughly practical and highly advantageous results. It will also be seen that I have provided a photographic negative and a photographic positive or print in which the manifold defects of present and past practice are done away with in a thoroughly reliable and practical way, undesirable contrasts between clear and sharp portions and vague and indistinct portions of the negative or photograph avoided, and substantial naturalness as to depth or relief achieved. It will also be seen that my invention is of a thoroughly practical nature and achieves thoroughly dependable and successful results.

As the art described herein might be varied in various ways and as certain of the mechanical features of my invention might be embodied in various forms, all without departing from the scope of my invention, it is to be understood that all matter above set forth is to be interpreted as illustrative and not in a limiting sense.

I claim:

1. The herein described art of photography which consists in exposing a sensitized photographic element to a scene through a lense system made up of a plurality of lenses, at least one of which is movable relative to the others and with its co-acting lenses corrected so that when moved it coacts with the other lenses to effect a change in the equivalent focal length without change in the position of the principal planes of the lens system, and moving the movable lens during the exposure.

2. The herein described art of photography which consists in interposing a lens system between a sensitized photographic element and a scene to be photographed, effecting successive exposures of said photographic element, and during each exposure changing the focus of the lens system while proportionately adjusting the lens system relative to the photographic element as to maintain the size of the image for a succeeding exposure the same as the size of the image for a preceding exposure.

3. The herein described art of photography which consists in interposing a lens system having a plurality of component lenses between a single frame of a sensitized photographic element and a scene to be photographed, effecting a succession of exposures of said element through said lens system, changing the focus for each exposure while proportionately and relatively adjusting a component of said lens system and said lens system with respect to the photographic element to make the size of the image resulting from one exposure the same as the size of the image resulting from a preceding exposure.

4. The herein described art of photographing a scene or object having portions extending from a point near the sensitized photographic element to a point relatively remote from the latter, which consists in passing light rays from the scene or object through a lens system and onto said sensitized photographic element and changing the focus of said lens system so as to focus the optical system successively upon successive portions of the scene or object extending from said one point to said other point while maintaining constant the sizes of the images corresponding to the successive changes in focus.

5. The herein described art of photography which consists in passing light rays from a scene or object through a lens system to a sensitized photographic element, changing the focus of the lens system during exposure while at the same time so relatively and proportionately adjusting the optical system as to prevent change in focus from effecting change in size of the image of the scene or object, and changing the quantity of light passed to the photographic element as change in focus of the lens system brings portions of the scene or object nearer to the element into sharpness.

6. The herein described art of photography which consists in interposing a lens system between a sensitized photographic element and a scene to be photographed, effecting successive exposures at a rate with the persistance of vision of said photographic element, and during each exposure changing the focus of the lens system while proportionately adjusting the lens system relative to the photographic element as to maintain the size of the image for a succeeding exposure the same as the size of the image for a preceding exposure, and for each exposure changing the amount of light passed onto said photographic element.

7. The herein described art of photography which consists in interposing a lens system between a sensitized photographic element and a scene of substantial depth so that light rays from said scene pass onto said sensitized element, changing the focus of the lens system during exposure of said photographic element to bring into sharpness different portions of the scene throughout the depth of the latter while at the same time proportionately relatively adjusting an element of the optical system to prevent change in focus from effecting change in the size of the image of the scene, and changing the quantity of light passed from said scene onto said photographic element substantially proportionately as portions more remote from the photographic element are brought into prominence.

8. The method of photography which consists in exposing a sensitive surface to the action of light rays emanating from portions of the scene or object that lie in a single plane of sharpness and directed upon the surface through a lens system, and conjointly varying the focal length of the lens system to cause the sensitive surface to be exposed to the action of light rays emanating from portions of the scene or object that lie in a different plane of sharpness and recorrelating at least one element of the lens system with respect to the sensitive surface, along the optical axis, and with respect to the object or scene to a sufficient degree to cause the change of size of image that would otherwise accompany change of focus to be negatived.

9. The method of photography which consists in focusing a lens system so that light rays emanating from portions of the scene or object that lie in substantially a single plane of sharpness are directed upon a sensitive surface, cutting off the light rays, changing the focal length of the lens system and proportionately shifting the optical center of the lens system along its optical axis to bring portions of the scene or object that lie in a different plane, spaced from said plane of sharpness, into sharpness upon said sensitive surface and into registry with the image already thereon, and again exposing said sensitive surface to light rays passing through said lens system.

10. The method of photography which consists in exposing a sensitive surface to the action of light rays directed thereupon from an object or scene and through a lens system and changing the focal length of the lens system and proportionately changing the relation of the lens system, sensitive surface, and object or scene, with respect to each other to negative change of size of image upon change of focus so that for each change in focus the corresponding image of the scene or object produced upon the sensitive surface is of the same size.

11. In photography, the method of creating the appearance of relief, which comprises taking a picture, then changing the focal length of the lens and changing the relation between the lens and the sensitive surface in a direction along the optical axis by a movement sufficient to negative change of size of image that would otherwise accompany change of focal length, and superimposing upon said first picture a second picture registering therewith throughout but corresponding to a different plane of sharpness.

12. In photography, the method of creating the appearance of relief, which consists in taking a picture on a sensitive surface by means of a lens system, then changing the focal length of the lens system and proportionately changing the relation, in a direction along the optical axis of the system, between the optical center and the sensitive surface to maintain constant the size of image, and taking a plurality of pictures superimposed upon said first picture, each one corresponding to a different focal length but all registering throughout.

13. The method of creating the appearance of relief, which consists in directing light rays upon a sensitive surface through a lens system, and continually changing the focal length of the lens system during the passage therethrough of said light rays and proportionately and simultaneously changing the relation, in a direction along the optical axis of the lens system, between the optical center of the system and the sensitive surface relative to the scene to neutralize the change in size of image of the latter which would otherwise accompany change in focal length, whereby the successive images impressed upon the sensitive surface, though corresponding to different focal lengths, are in registry throughout.

14. The method of creating the appearance of relief which consists in producing a composite image by the superimposition upon a sensitive surface of an infinite number of images of the same scene or object and which register throughout, said last named images being produced by continually varying the focal length of the lens system used and by proportionately varying, to prevent change of focus from changing size of the images, the position along the optical axis of at least one lens element of the lens system relative to the sensitive surface, all throughout the period of exposure of the sensitive surface to light rays emanating from said scene or object.

15. The method of creating the appearance or relief, which consists in producing a composite image by the superimposition, upon a sensitive surface exposed to the scene or object through a lens system, of an infinite number of images of the scene or object registering throughout, by varying the focal length of the lens system through a certain range during the period of exposure of the sensitive surface and simultaneously and proportionately varying the spatial relation of at least one element of the optical system with respect to one or more other elements of the system to neutralize the change in size of image that would otherwise take place upon varying of the focal length, thereby to maintain registry of all of the images.

16. The method of photography which consists in taking a series of superimposed pictures upon a sensitive surface by means of a lens system, the units of said series being produced by so altering the relation between the sensitive surface and optical center of the lens system and the value of the focal length that, though the focal length changes, the size of image does not change, thereby to produce images of the object or scene corresponding to different planes of sharpness but all of the same size.

17. In photography, the method of producing a series of superimposed registering images of the same scene or object upon a light sensitive surface exposed thereto through a lens system, each image corresponding to a different plane of sharpness, which consists in varying, during the period of exposure of the light sensitive surface, the focal length of the lens system, thus to bring into effect different planes of sharpness, and proportionately varying the relation between the said surface and the optical center of the lens system to such an extent that the change of size of image accompanying the variation in the focal length of the lens system is neutralized.

18. The photographic art of impressing upon a sensitized photographic element a plurality of images of an object or scene, each image being of the same size and each image corresponding to a different plane of sharpness, which consists in exposing the sensitized element to the scene or object through a lens system made up of a plurality of lenses, one of which is a negative lens and is movable and is, with the remaining lenses of the system, corrected to give the same size of image on the sensitized element for all positions of the movable lens within a certain range of movement of the movable lens, and in moving the movable lens within said range of movement during exposure of said sensitized element to the scene or object.

19. The photographic art of impressing upon a sensitized photographic element a plurality of superimposed and registering images of a scene, each image corresponding to a different plane of sharpness, which consists in exposing the sensitized element to the scene or object through a lens system made up of a plurality of lenses, one of which is movable relative to the others throughout a certain range, said movable lens and its related co-acting lenses being corrected to give concentricity of circles of confusion produced by changes of focus with respect to the in-focus image of any point objects, throughout the said range of movement, and during exposure of the sensitized element moving the movable lens within said range.

20. The photographic art of achieving a composite image of a scene or object, which composite image is made up of an infinite number of registering images of a scene or object and component images corresponding to progressively differing distant planes of sharpness throughout the depth of the scene or object, which consists in exposing the sensitized element to the scene or object through a lens system made up of a plurality of lenses of which at least one is movable throughout a certain range and which, with the remaining lenses, is corrected to progressively shift the plane of sharpness throughout the depth of the scene or object and corrected also to give constancy of size of in-focus and out-of-focus images on the sensitized element as the plane of sharpness is shifted, and in moving the movable lens of the lens system within its said range of movement during exposure of the sensitized element to the scene or object.

21. The photographic art of achieving a composite image of a scene or object, which composite image is made up of an infinite number of registering images of a scene or object and component images corresponding to progressively differing distant planes of sharpness throughout the depth of the scene or object, which consists in exposing the sensitized element to the scene or object through a lens system made up of a plurality of lenses of which at least one is movable throughout a certain range and which, with the remaining lenses, is corrected to progressively shift the plane of sharpness throughout the depth of the scene or object and corrected also to give constancy of size of in-focus and out-of-focus images on the sensitized element as the plane of sharpness is shifted, and in moving the movable lens of the lens system within its said range of movement during exposure of the sensitized element to the scene or object, and progressively changing the amount of light passed onto the sensitized element as the plans of sharpness is shifted.

22. A photographic film having thereon a composite image made up of an infinite number of registering images of a scene or object having depth, the component images corresponding respectively to an infinite number of different planes of sharpness ranging throughout the depth of the scene or object.

23. A photographic element comprising a layer of a light sensitive photographic emulsion and a supporting base therefor, the said layer having registered therein a composite image of a scene or object having depth made up of an infinite number of component images which are congruent with one another and register throughout, each component image corresponding to a different plane of sharpness positioned along the depth of the scene or object and resulting from the actinic action on the emulsion by light rays emanating from that portion or portions of the scene or object within the plane of sharpness.

24. A photographic element having a composite image of a scene or object which has depth, said image being made up of a plurality of component images of the scene or object, each component image corresponding to a different plane of sharpness positioned along the depth of the scene or object, the out-of-focus images being made up of circles of confusion which are concentric with the corresponding point images of the in-focus component ring.

25. A photographic element having thereon a composite image of a scene or object which has depth, made up of an infinite number of component images one of which is an in-focus image corresponding to a given plane of sharpness in the scene or object and others of which are out-of-focus images of the scene or object in the said plane of sharpness and are made up of circles of confusion which are concentric with the corresponding point images that make up the in-focus component image.

26. A photographic element having thereon a composite unitary image of a scene or object having depth, said image being made up of a plurality of component images of the scene or object, each component image corresponding to one of a plurality of different planes of sharpness positioned along and within a predetermined depth of the scene or object, the out-of-focus component images being made of circles of confusion which are concentric with the corresponding point images of the in-focus component image.

27. A photographic motion picture film made up of a series of successive sections, each section having thereon a composite image of a scene or object having depth, said composite image being made of a plurality of registering component images of the scene or object, each component image corresponding to a different plane of sharpness positioned along and within the depth of the scene or object.

28. A photographic motion picture film made up of a series of successive sections, each section having thereon a composite image of a scene or object having depth, said composite image being made up of an infinite number of component images of the scene or object, each component image corresponding to a different one of an infinite number of planes of sharpness positioned along and within the depth of the scene or object, and the out-of-focus images being made up of circles of confusion which are concentric with the corresponding point images that make up an in-focus component image.

29. The photographic method of recording pictures that exhibit the illusion of the relief or depth of the scene or object itself which consists in successively exposing, at a rate within the persistance of vision, successive sections of a sensitized photographic film in strip form to the scene or object through a lens system made up of a plurality of lenses, one of which lenses is movable and is, with the remaining lenses of the system, corrected to give the same size of image on a section of the film for all positions of the movable lens within a certain range of movement of the movable lens, and in moving the movable lens within said range of movement during each of the successive exposures of the said successive sections of said film.

30. The photographic method of recording pictures that exhibit the illusion of the relief or depth of the scene or object itself which consists in successively exposing, at a rate within the persistence of vision, successive sections of a sensitized photographic film in strip form to a scene or object through a lens system made up a plurality of lenses, one of which lenses is movable and is, with the remaining lenses of the system, corrected to effect a range of change of focus between two planes spaced along the optical axis and to give the same size of image on the exposed section of said film for all values of focus within said range of change, and in moving the movable lens within its range of movement during each successive exposure of said successive sections of said film.

LUDWIG M. DIETERICH.

CERTIFICATE OF CORRECTION.

Patent No. 1,927,925. September 26, 1933.

LUDWIG M. DIETERICH.

It is hereby certified that error appears in the printed specification of the above numbered patent requiring correction as follows: Page 8, line 48, for "amont" read amount; and line 97, for "camora" read camera; page 12, line 58, claim 24, after "having" insert thereon; and line 67, for "ring" read image; and that the said Letters Patent should be read with these corrections therein that the same may conform to the record of the case in the Patent Office.

Signed and sealed this 5th day of December, A. D. 1933.

(Seal)

F. M. Hopkins
Acting Commissioner of Patents.